April 18, 1944.  R. G. CARLSON  2,346,904
VALVE
Original Filed June 19, 1941   3 Sheets-Sheet 1

Inventor:
Ralph G. Carlson
By: Joseph O. Lange Atty.

April 18, 1944.　　　R. G. CARLSON　　　2,346,904
VALVE
Original Filed June 19, 1941　　3 Sheets-Sheet 2

Inventor:
Ralph G. Carlson
By Joseph O. Lange
Atty.

Inventor:
Ralph G. Carlson
By Joseph O. Lange
Atty.

Patented Apr. 18, 1944

2,346,904

UNITED STATES PATENT OFFICE 2,346,904

VALVE

Ralph G. Carlson, Chicago, Ill., assignor to Crane Co., Chicago, Ill., a corporation of Illinois Original application June 19, 1941, Serial No. 398,743, now Patent No. 2,289,574, dated July 14, 1942. Divided and this application December 26, 1941, Serial No. 424,487

2 Claims. (Cl. 137—139)

This invention is a division of my application filed June 19, 1941 identified Serial No. 398,743 now Patent No. 2,289,574, granted July 14, 1942, entitled Valve and relates to a new and improved packless valve, which has for one of its principal objects the provision of a magnetic clutch means for opening and closing the valve by the employment of permanent magnets positioned externally and internally of the valve with a magnetic flux operating therebetween.

Another important object of this invention is to provide a compact valve wherein no packing is required, thus overcoming the usual leakage problem or "freezing" of the conventional stuffing-box packing as ordinarily occasioned by the packing sticking to the stem after standing for some period of time.

Another important object of this device lies in the provision of a magnetic clutch operating means for valves of all types by the use of permanent magnets of such a high coercive force that the demagnetization by shock or heat is practically eliminated.

A still further important object of this invention is to provide a packless valve wherein the rotation of an externally positioned magnet cooperates with an internally positioned magnet to cause substantially simultaneous rotation of the valve closure member whereupon by the occurrence of such rotation, the valve is either opened or closed.

Other and further objects of this invention will become apparent from the disclosures considered in connection with the accompanying drawings and following specification.

The invention in a preferred form is shown in the drawings and hereinafter more fully described.

Figure 1:
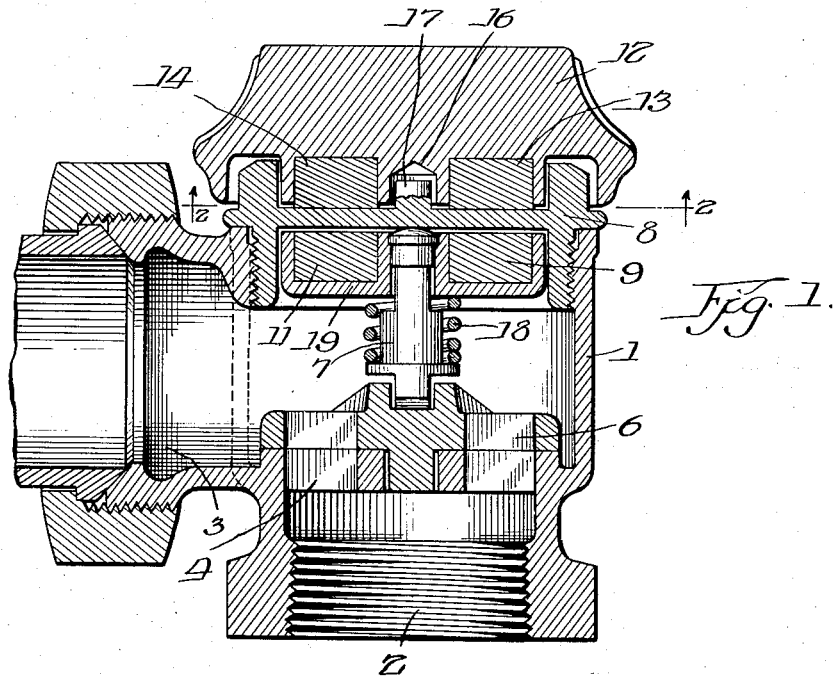
Fig. 1 shows a radiator valve embodying one form of my invention.
Figure 2:
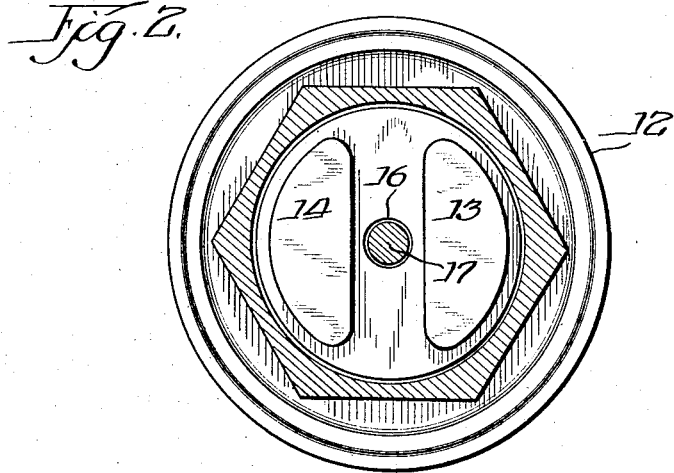
Fig. 2 is a sectional view taken on the line 2—2 of Fig. 1.

As shown in the drawings and referring specifically to Fig. 1, the reference numeral 1 indicates generally the casing or body of a radiator valve or similar device. The valve is provided with the usual inlet 2 and the outlet 3 and has a seat 4 for fluid tight contact with a closure member or disc 6 having in cooperative relation the stem 7. The upper end of the valve is closed by the plug 8 screw threadedly attached, as indicated, to the body 1. Mounted on either side of the plug 8 are the magnets 9 and 11 having opposite polarities. A cap or handwheel 12 is provided with the magnets 13 and 14 also having opposite polarities and positioned respectively directly above the magnets 9 and 11. The handwheel 12 is provided with a recessed portion or socket 16 for the reception of the extension 17 or the like which is positioned centrally of the plug 8. The closure member 6 and the stem 7 are urged toward and against the valve seat 4 by means of the spring 18. The magnets 9 and 11 are preferably positioned within a frame member 19 which is fixedly or non-rotatably attached to the stem 7 for direct rotation with the latter member. In this particular type of valve illustrating a preferred embodiment of my invention, the seat 4 and the closure member 6 operating thereon are preferably of the slotted opening type wherein a rotation of the closure member 6 in a single plane causes either an alignment of the openings or else a closing of the openings.

The magnets 9 and 13 are of opposite polarities as are the magnets 11 and 14. Inasmuch as these magnets have opposite polarities they attract each other and a turning of one will thereby exert a force sufficient to turn the other. A rotation of the handwheel 12 causes a rotation of the inset magnets 13 and 14 and the magnetic flux between each of these magnets with their respective component magnets 9 and 11 causes the magnets 9 and 11 to likewise rotate. The cage 19 having the magnets 9 and 11 positioned therein similarly turns and in proper sequence it rotates the stem 7 causing a rotation of the disc 6, for effecting either an opening or closing of the valve, depending upon the direction of rotation.

Figure 3:
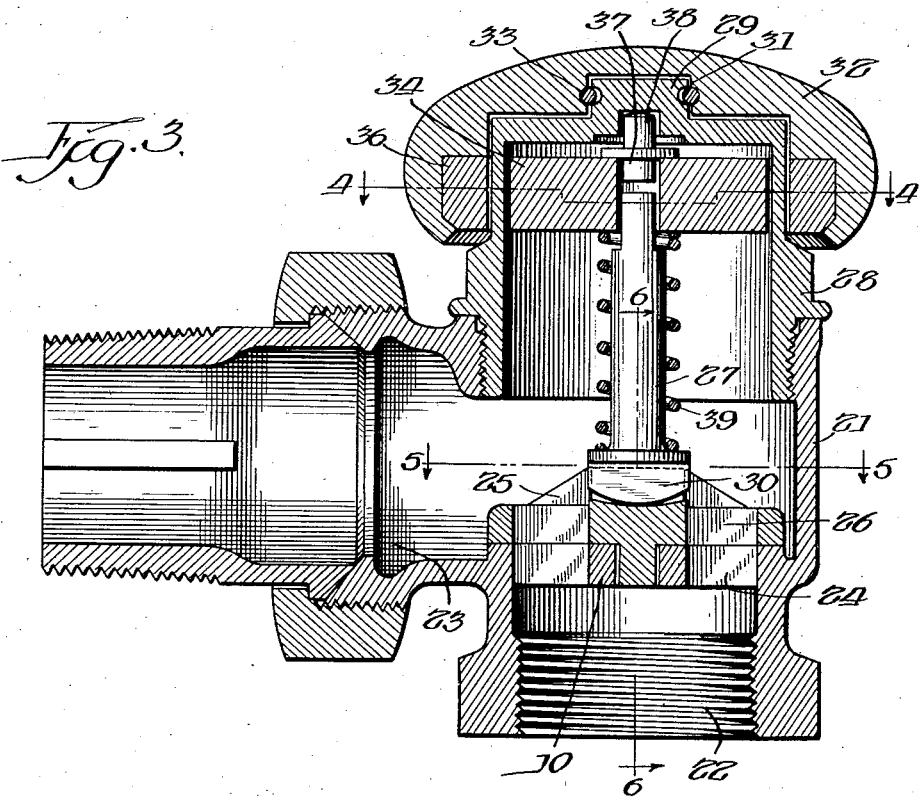
Fig. 3 shows a modified form of my invention.
Figure 4:
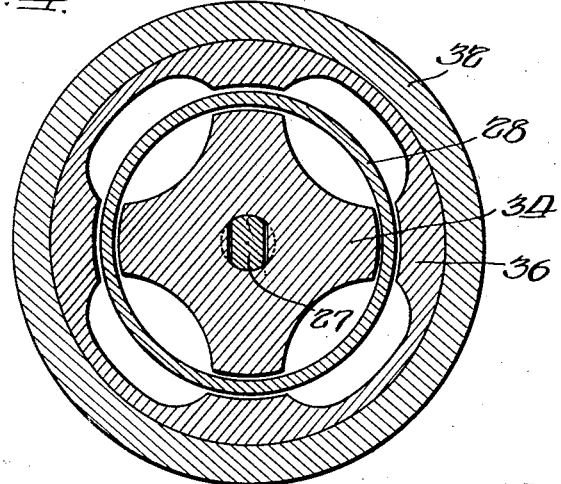
Fig. 4 is a sectional view taken on the line 4—4 of Fig. 3.
Figure 5:
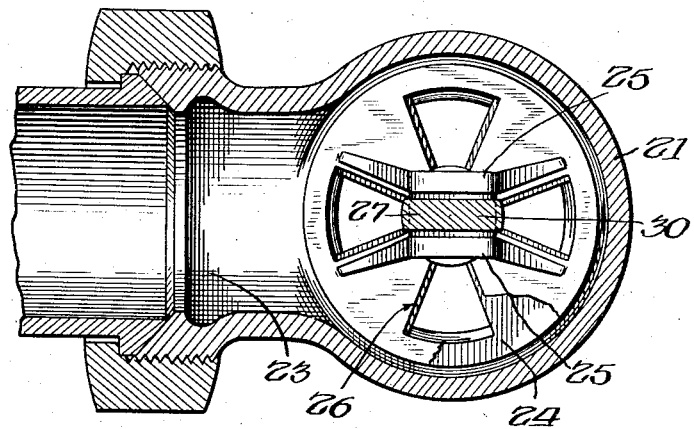
Fig. 5 is a sectional view taken on the line 5—5 of Fig. 3.

Fig. 3 shows another type of valve having a body or casing 21 with the usual inlet 22 and an outlet 23. A valve seat 24 has coacting therewith the disc or closure member 26 to which the stem 27 is attached in non-rotatable relation for purpose of actuation. The casing is equipped with the hollow plug 28, and the latter member is provided with a short projection 29 fitting into a socket 31 of the handwheel 32. Around the projection 29 and within the socket 31 an expansion ring 33 is fitted, forming a locking relation between the handwheel 32 and the hollow plug 28. Within the hollow plug 28 the magnet 34 is positioned, as best shown in Fig. 4. Within the handwheel 32 another magnet 36 is mounted concentric with the magnet 34. As best shown in Fig. 4, there are preferably four poles to each magnet and they are aligned so that opposite poles of the magnet coact with each other. The magnet 34 is mounted non-rotatably relative to the stem 27 so that it will impart rotary motion thereto. As shown in Fig. 3, the stem 27 is divided, leaving a space between the lower part and the upper part 37 which is received in the socket 38 of the plug 28. The lower half of the stem 27 is impelled downwardly by the spring 39 whereupon the disc or closure member is also urged against the seat 24. It will be noted that the disc and seat of Fig. 3 is similar to the disc and seat of the valve as shown in Fig. 1. Openings in the disc and seat are selectively provided as desired, to permit of the passage or non-passage of fluid therethrough.

Figure 6:
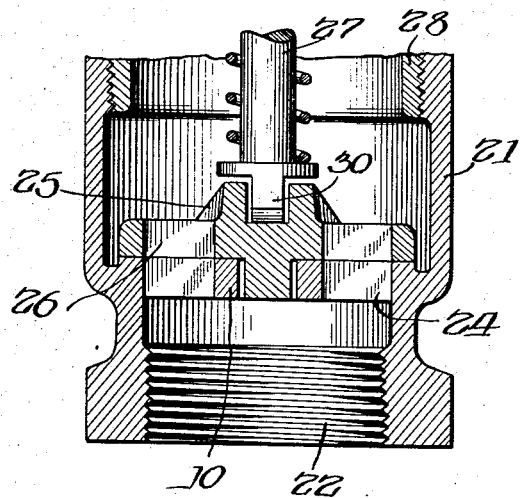
Fig. 6 is a fragmentary sectional view of the lower portion of the assembly shown in Fig. 3 taken at right angles to the view shown therein.

In valves wherein magnetic clutches are employed to operate an internal disc by rotation and without actual engagement therewith, it is necessary to minimize friction and other elements which ordinarily tend to make the disc rotatable only upon the employment of a considerable amount of operating torque. The valves shown in Figs. 1, 3 and 6 all show metal-to-metal contacting surfaces between the closure member and the seat whereas, in contradistinction thereto, present day radiator valves generally employ a composition or the like type of disc which tends to stick to the metal and prohibits or retards rotation thereof during the opening and closing movements of the valve. The smooth metal-to-metal contact employed herein is conducive to easy slidable rotation during valve operation, and elimination of stuffing-box packing also reduces the usual torque necessary for operating these valves.

Permanent magnets of the aluminum nickel alloy type have been developed in recent years to such an extent that the coercive force of these magnets prevents demagnetization by heat or shock or the like and permits a permanent magnet to be constructed to operate satisfactorily in the capacity hereinbefore described.

It is apparent that the numerous details of construction may be varied throughout a wide range without departing from the principles and purposes of my invention, and it is therefore not intended to limit the scope of the appended claims otherwise than as necessitated by the prior art.

I claim:

1. A packless valve comprising a body having an inlet and an outlet, a ported seat in the said body, a closure member for controlling the opening and closing of the ports of the said seat, permanent magnets non-rotatably associated with the said closure member, actuating means therefor, a stem cooperating with the said closure member, complementary permanent magnets associated with the said actuating means whereby lines of magnetic force from unlike magnetic poles of the said magnets attract each other and upon rotational movement of the said actuating means a similar rotational movement of the said closure member is effected, the said magnets associated with the said closure member being axially movable relative to the said stem, resilient means cooperating with the said stem to maintain the said latter mentioned magnets in spaced-apart relation to the closure member.

2. In a valve of the character described, the combination comprising a casing, a closure member therefor, actuating means therefor comprising means for rotating the said closure member including a plurality of permanent magnets, one of the said magnets being operatively connected to the said actuating means, the other cooperating in non-rotatable relation with the said closure member whereby upon rotation of the said actuating means the said closure member is caused to rotate similarly under the influence of the magnetic flux between the said magnets, resilient means for maintaining the said latter magnet in spaced-apart relation to the said closure member.

RALPH G. CARLSON.